United States Patent
Tefft et al.

(10) Patent No.: US 7,469,171 B2
(45) Date of Patent: Dec. 23, 2008

(54) METHOD AND SYSTEM FOR VEHICLE EMISSIONS TESTING AT A KIOSK THROUGH ON-BOARD DIAGNOSTICS UNIT INSPECTION

(75) Inventors: Robert J. Tefft, Crestwood, KY (US); S. Jay Gordon, Louisville, KY (US)

(73) Assignee: Gordon-Darby Systems, Inc., Louisville, KY (US)

( * ) Notice: Subject to any disclaimer, the term of this patent is extended or adjusted under 35 U.S.C. 154(b) by 766 days.

(21) Appl. No.: 11/054,790

(22) Filed: Feb. 10, 2005

(65) Prior Publication Data

US 2005/0182537 A1  Aug. 18, 2005

Related U.S. Application Data

(60) Provisional application No. 60/544,458, filed on Feb. 13, 2004.

(51) Int. Cl.
*G07C 5/00* (2006.01)
*G05B 23/02* (2006.01)

(52) U.S. Cl. .............................. 701/29; 701/33; 701/30; 701/35; 701/31; 180/270; 324/378

(58) Field of Classification Search ................... 701/29, 701/33, 35; 180/270; 324/378
See application file for complete search history.

(56) References Cited

U.S. PATENT DOCUMENTS

| | | | |
|---|---|---|---|
| 4,754,519 A * | 7/1988 | Duran et al. | 15/314 |
| 5,055,657 A * | 10/1991 | Miller et al. | 235/381 |
| 6,636,790 B1 * | 10/2003 | Lightner et al. | 701/33 |
| 6,775,602 B2 | 8/2004 | Gordon, Jr. et al. | |
| 6,836,708 B2 * | 12/2004 | Tripathi | 701/29 |
| 7,124,058 B2 * | 10/2006 | Namaky et al. | 702/183 |
| 2002/0007237 A1 * | 1/2002 | Phung et al. | 701/33 |
| 2002/0123833 A1 * | 9/2002 | Sakurai et al. | 701/33 |
| 2003/0130774 A1 * | 7/2003 | Tripathi et al. | 701/33 |
| 2004/0227523 A1 * | 11/2004 | Namaky | 324/537 |
| 2005/0043868 A1 * | 2/2005 | Mitcham | 701/29 |
| 2006/0255967 A1 * | 11/2006 | Woo et al. | 340/928 |

FOREIGN PATENT DOCUMENTS

WO  WO 2007038513 A2 *  4/2007

* cited by examiner

*Primary Examiner*—Thomas G Black
*Assistant Examiner*—Lin B Olsen
(74) *Attorney, Agent, or Firm*—Stites & Harbison, PLLC; David W. Nagle, Jr.

(57) ABSTRACT

A decentralized method and system for vehicle emissions testing uses the OBD unit of the vehicle to be tested and includes a remote data storage location in communication with a plurality of decentralized inspection stations or test locations. Each inspection location is designed to allow for "self-service" inspection through a kiosk that includes all of the hardware and software necessary to carry out the testing process and to communicate test data and information to the remote storage location.

24 Claims, 5 Drawing Sheets

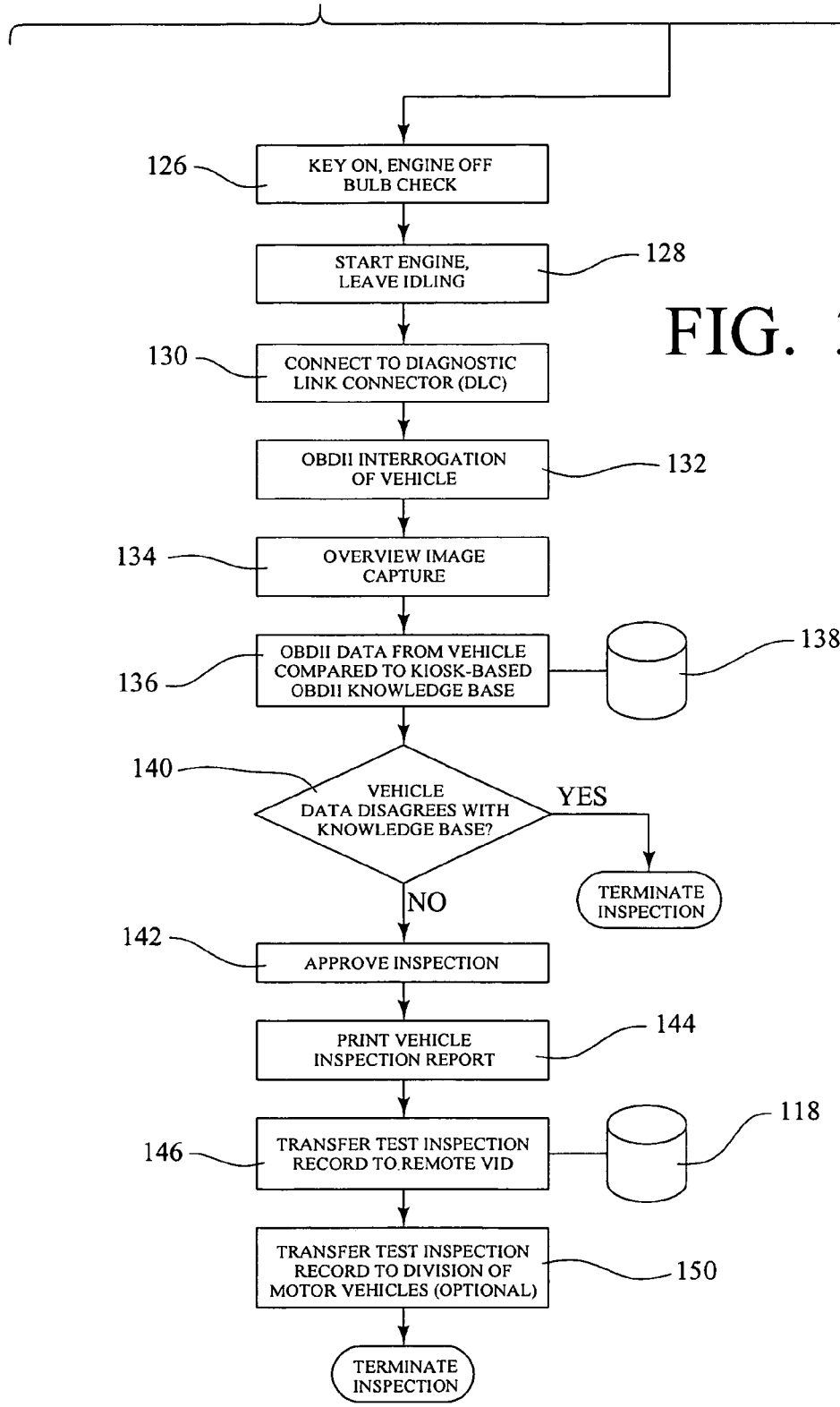

METHOD AND SYSTEM FOR VEHICLE EMISSIONS TESTING AT A KIOSK THROUGH ON-BOARD DIAGNOSTICS UNIT INSPECTION

CROSS-REFERENCE TO RELATED APPLICATIONS

The present application claims priority to U.S. Provisional Application Ser. No. 60/544,458 filed Feb. 13, 2004, the entire disclosure of which is incorporated herein by reference.

BACKGROUND OF THE INVENTION

The present invention relates to a method and system for vehicle emissions testing, and, more particularly, to a decentralized method and system that uses the On-Board Diagnostics unit of the vehicle to be tested, a method and system that combines the security and reliability of centralized emissions testing with the convenience of decentralized testing programs.

Recognizing the adverse effects that vehicle emissions have on the environment, the 1990 Clean Air Act requires that communities in geographic regions having high levels of air pollution implement Inspection and Maintenance ("I/M") programs for vehicles in the particular geographic regions. Such I/M programs are intended to improve air quality by periodically testing the evaporative and exhaust systems of vehicles in the community and ensuring their proper operation and maintenance. By ensuring that the evaporative and exhaust systems of vehicles are operational and properly maintained, air pollution resulting from vehicle emissions in the geographic region should be drastically reduced.

Currently, I/M programs in the United States typically employ some method of "tailpipe" testing as the primary means of inspection. Although there are several different variations in common tailpipe testing methods, the core function of tailpipe testing remains the same. First, a probe is attached to, or inserted into, the tailpipe of the vehicle being tested to collect exhaust as the engine of the vehicle is running. The collected exhaust is then introduced into a series of gas analyzers in order to determine its composition. Finally, a report of the amount of measured pollutants is generated.

Regardless of the specific tailpipe testing method used, all I/M programs can be classified as either centralized, decentralized, or a hybrid thereof. Centralized I/M programs require that vehicle owners take their vehicles to one of the community's centralized inspection stations. Each such inspection station is designed to maximize vehicle throughput without sacrificing test integrity and auditing ability. Since each inspection station in a centralized program is typically "test only" and often operated by an independent contractor retained by a governmental body, the inspection stations are generally very secure and serve as a deterrent to fraudulent testing practices. However, although centralized inspection stations offer the statistical tracking and fraud deterrent that the governmental body might desire, they are often criticized because they are not necessarily convenient to vehicle owners. Indeed, a community may decide in favor of motorist convenience and opt for a decentralized tailpipe testing program.

In a decentralized I/M program, a greater number of inspection stations is scattered throughout the community. These inspection stations are often located within a private business, such as a mechanic's repair shop, and are administered by the private citizens employed by the business. Therefore, in many cases, no single central entity supplies the equipment and personnel required for the I/M program.

While decentralized testing is well-suited for customer convenience, the potential for fraudulent and inadequate testing is much greater than in a centralized program. As such, some practices have been implemented to serve as a fraud deterrent in decentralized test programs. For example, certification of a decentralized inspection station is often required. If a particular inspection station was found to be purposely passing non-compliant vehicles, its certification could be revoked, thereby preventing it from legally administering vehicle emissions tests. Of course, since purchasing the equipment required for vehicle emissions testing is an extremely expensive endeavor, the loss of certification serves as a severe financial disincentive to fraudulent and inadequate testing practices. Furthermore, the private business might also be stripped of other professional licenses or certifications required to operate the business, providing another disincentive to fraudulent and inadequate testing practices.

The Environmental Protection Agency ("EPA") has now developed a new mobile source emission factor model, referred to as MOBILE6, and has approved a new method of vehicle emission testing for use in I/M programs that makes use of the On-Board Diagnostics ("OBD") unit. This unit is installed on most of the vehicles manufactured since 1996 that are authorized to be operated in the U.S. Specifically, the OBD unit is designed for communication with an electronic scanning device that is temporarily connected to the vehicle, thereby allowing for prompt and efficient identification of any vehicle components or devices which the OBD unit believes to be malfunctioning. Included among the components monitored by the OBD unit are the vehicle's evaporative and exhaust systems, the systems which are the primary focus of I/M programs and vehicle emissions testing.

As mentioned above, MOBILE6 is a new mobile source emission factor model developed by the EPA. MOBILE6 uses a series of mathematical algorithms to determine if a community or geographic region is in compliance with the federal standards for mobile source (i.e., vehicular) emissions. A major factor in this mathematical computation is the credit assigned to the different types of tailpipe testing methods and OBD testing. The MOBILE6 model favors OBD testing, assigning a greater credit to such testing as compared to tailpipe testing methods. The high degree of credit assigned to OBD testing in the MOBILE6 model, along with its relative ease of use and low cost, make it a significant component of future I/M programs and vehicle emissions testing.

Of course, since OBD units are only installed on vehicle manufactured since 1996, OBD testing may be implemented in conjunction with existing I/M programs that employ tailpipe testing methods. It is not difficult to envision this OBD testing being incorporated into an existing centralized I/M environment. Specifically, since the centralized inspection stations are already established, a vehicle owner would simply go to the inspection station as before, but would have the OBD testing performed rather than traditional tailpipe testing. As mentioned above, since the inspection stations in a centralized program are often operated by an independent contractor retained by a governmental body, the inspection stations are generally very secure and serve as a deterrent to fraudulent testing practices.

However, implementing OBD testing in a decentralized I/M program raises serious issues concerning fraudulent and inadequate testing practices. While a current decentralized I/M program employing tailpipe testing methods could be expanded to include OBD testing, it could be further expanded such that a vehicle owner would not need to go to a mechanic or similar business for an emissions test. With OBD testing replacing traditional tailpipe testing methods, the amount of training and equipment needed to properly administer the test is drastically reduced. Whereas a skilled mechanic with properly maintained equipment was required for tailpipe testing methods, anyone with an OBD scanning device and a minimal amount of instruction can now perform OBD testing. Therefore, a private business or individual can enter the decentralized "test only" market for vehicle emissions testing without the certification a mechanic would earn and without the expensive equipment investment. In this scenario, the disincentives for fraudulently testing vehicles are greatly diminished. Thus, there is also a concern that unintentional passing of noncompliant vehicles will become more prevalent due to lack of supervision and training. Finally, while the administration of the OBD testing is of paramount importance, another concern arises with respect to data transfer. In current decentralized I/M programs, emission test data is often transferred from the inspection stations to a database at a central management facility via the Internet or dedicated phone line. Since OBD testing operations could be established with little financial investment, there is no guarantee that these operations would have facilities to securely and reliably transfer emission test data to the appropriate central management facility.

Such concerns cast a great deal of skepticism on the mass availability of accurate and secure OBD testing in a decentralized I/M environment. From the possibilities of fraudulent testing practices and erroneous test results to the uncertainty of data reporting and accuracy, there is clearly a need for developing a structured approach to implementing OBD testing in a decentralized I/M environment.

U.S. Pat. No. 6,775,602, which is also owned by the assignee of the present application, describes one proposed decentralized method and system for vehicle emissions testing that uses the OBD unit of the vehicle to be tested and provides the security and reliability of centralized OBD testing. Generally, the method and system described in the '602 patent includes a remote overview or supervisory location in communication with a plurality of decentralized inspection stations or test locations. Supervisory personnel at the remote overview location communicate with the inspectors at the individual test locations through an Internet connection, satellite communications, or similar means of data transport. The remote overview location operates much like a bank of hotline operators. At the beginning of an emissions test, the inspector at a particular inspection location is randomly assigned to a test supervisor at the remote overview location. This test supervisor is in video and data communication with the inspection location and thus is able to monitor and audit all aspects of the OBD testing process, including a review of the actual test data. If there is any perceived impropriety in the testing (e.g., suspicion of fraud, inadequate testing, or equipment malfunction), the test supervisor can disapprove of the test and reject its results. Furthermore, the remote overview location also preferably serves as a central hub for the receipt of all data resulting from the emissions testing, ensuring that all pertinent data is properly transferred to and received by the governmental body that maintains the vehicle inspection records.

It is an object of the present invention to provide a similar decentralized method and system for vehicle emissions testing that uses the OBD unit of the vehicle to be tested, a method and system that combines the security and reliability of centralized OBD testing with the speed and accessibility of decentralized testing programs, but further allows for a "self-service" inspection of the vehicle by the vehicle owner.

This and other objects and advantages of the present invention will become apparent upon a reading of the following description.

SUMMARY OF THE INVENTION

The present invention is a decentralized method and system for vehicle emissions testing that uses the OBD unit of the vehicle to be tested, a method and system that combines the security and reliability of centralized emissions testing with the convenience of decentralized testing programs.

In an exemplary implementation of the method and system of the present invention, a remote data storage location is in communication with a plurality of decentralized inspection stations or test locations. Each inspection location is designed to allow for "self-service" inspection. In other words, a vehicle owner may conduct the testing on his own and/or with the assistance of an attendant. As such, there are one or more kiosks at each inspection location, each kiosk including all of the hardware and software necessary to carry out the testing process and to communicate test data and information to the remote storage location.

For example, an exemplary kiosk may comprise a cabinet that houses the necessary testing equipment, including (a) an OBD scanning device, which is operably linked to an internal computer housed within the cabinet; and (b) a bar code scanner, which is also operably linked to the internal computer. Furthermore, a touch screen monitor may be housed within the cabinet and viewable through an opening through the front portion of the cabinet for providing instructions and/or soliciting information from the vehicle owner. Speakers may also be connected to the internal computer to provide necessary audio instructions and information to the vehicle owner, along with a printer for dispensing printed receipts or other documents. Finally, the cabinet may also house a number of additional input devices, for example, a microphone and a keyboard. Also, to facilitate payment for the inspection services, the cabinet may house a magnetic card reader (for credit or debit card payment), a paper currency/coupon acceptor (such as that installed common vending machines), and a change/bill drawer (such as that installed in an automated teller machine).

It is further contemplated that each inspection location is designed such that the vehicle to be tested can be observed by an overview camera, which records images of the vehicle and the inspection location at selected times throughout the testing process.

The OBD testing process commences when a vehicle arrives at a kiosk at an inspection location. Through a display device, the vehicle owner is provided with the option of viewing a video or similar multimedia presentation regarding the testing process and/or step-by-step instructions on how to perform the testing. Then, payment is solicited from the vehicle owner.

Once payment has been made, data must be solicited to identify the vehicle, preferably through input of the Vehicle Identification Number ("VIN"), which can be accomplished using the bar code scanner or another provided input device. Once the vehicle attributes and the specific testing requirements for the vehicle have been derived from the VIN, the actual testing process commences, with the vehicle owner being prompted to complete certain tasks, including connecting the OBD scanning device to the OBD connector of the vehicle. Once the OBD scanning device is connected, it interrogates the vehicle to solicit the necessary information and data from the vehicle's on-board computers, completing the requisite testing.

Once the information and data has been solicited and acquired from the on-board computers of the vehicle, it is promptly analyzed through comparison of the solicited information and data to a knowledge base of known testing data. The purpose of this analysis is to audit the information and data, i.e., to identify whether there are any irregularities in the acquired information and data that would indicate fraud or otherwise cast doubt on the validity of the testing. Assuming there are no such irregularities, the inspection is approved, and all acquired information and data, including the identification information and the captured images of the vehicle during the testing process, are collected in an electronic "inspection record" and transmitted to the remote data storage location.

DETAILED DESCRIPTION OF THE INVENTION

The present invention is a decentralized method and system for vehicle emissions testing that uses the OBD unit of the vehicle to be tested, a method and system that combines the security and reliability of centralized emissions testing with the convenience of decentralized testing programs.

Figure 1:
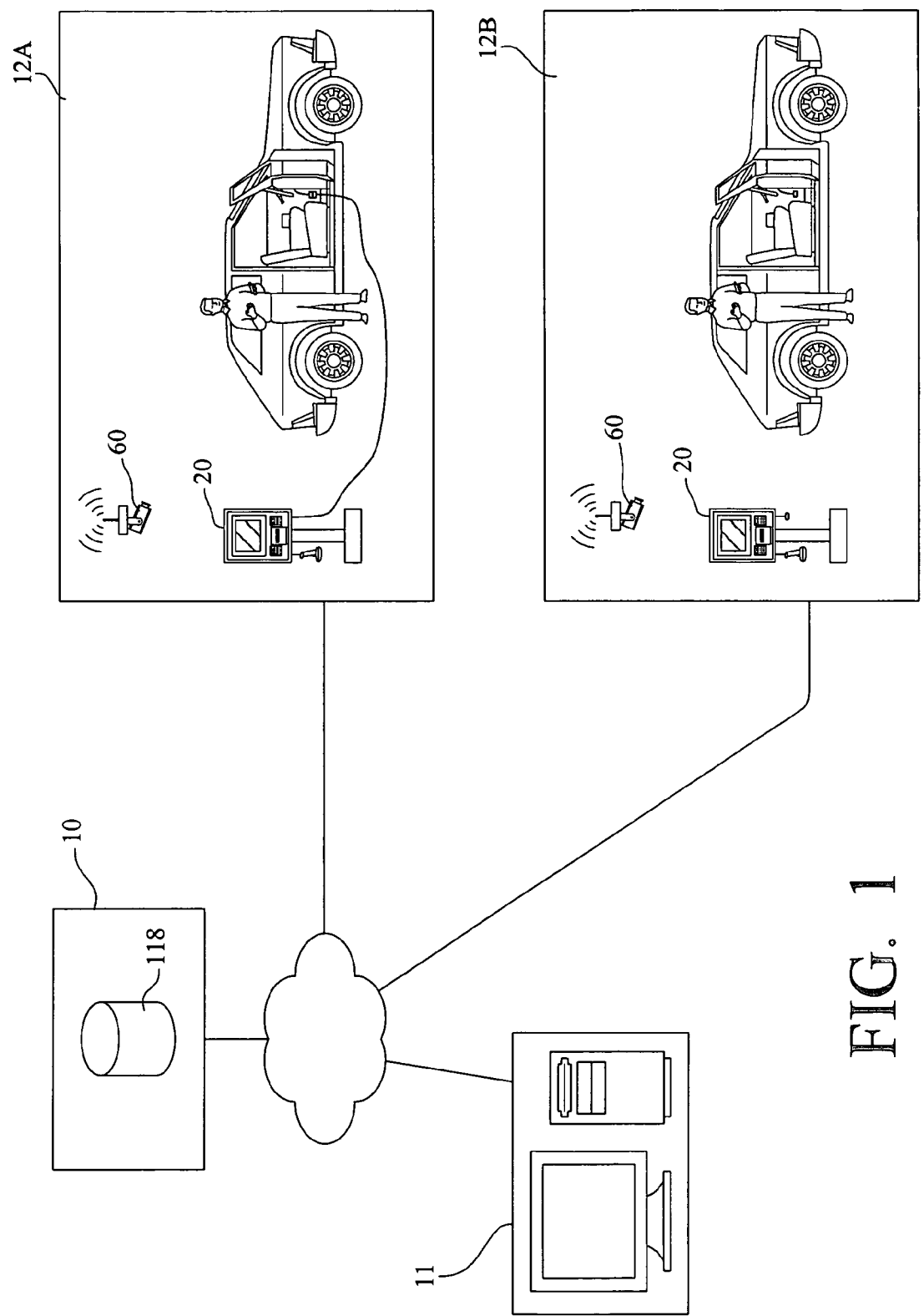
FIG. 1 is a schematic view of an exemplary implementation of the method and system of the present invention, including a remote data storage location and vehicle information database in communication with a plurality of decentralized inspection stations or test locations.

FIG. 1 is a schematic view of an exemplary implementation of the method and system of the present invention, including a remote data storage location 10 in communication with a plurality of decentralized inspection stations or test locations 12A, 12B. Test data and information is communicated from the individual test locations 12A, 12B through an Internet connection, satellite communications, or similar means of data transport to the remote storage location 10. Indeed, test data and information could be communicated to multiple remote locations without departing from the spirit and scope of the present invention. Similarly, although two decentralized inspection stations 12A, 12B are illustrated in FIG. 1 for purposes of example, a virtually infinite number of inspection stations could be incorporated into the method and system of the present invention without departing from the spirit and scope of the present invention.

Referring still to FIG. 1, each inspection location 12A, 12B is designed to allow for "self-service" inspection. In other words, a vehicle owner may conduct the testing on his own and/or with the assistance of an attendant. As such, there are one or more kiosks 20 at each inspection location, each kiosk 20 including all of the hardware and software necessary to carry out the testing process and to communicate test data and information to the remote storage location 10. In this regard, the term "remote" indicates a location apart from the kiosks; in short, test data and information does not remain solely at each kiosk. However, the remote storage location 10 could be in relatively close physical proximity to the kiosks 20 at a particular inspection location. For example, to the extent that a kiosk 20 was located near a traditional facility for tailpipe testing, the remote data storage location 10 might be a central database at that facility that accumulates and stores all test data and information, irrespective of the method by which it was acquired. Alternatively, to the extent that kiosks 20 were interspersed throughout a community, the remote data storage location 10 might be a command center or computer that is physically distant from most, if not all, of the kiosks 20.

Figure 2:
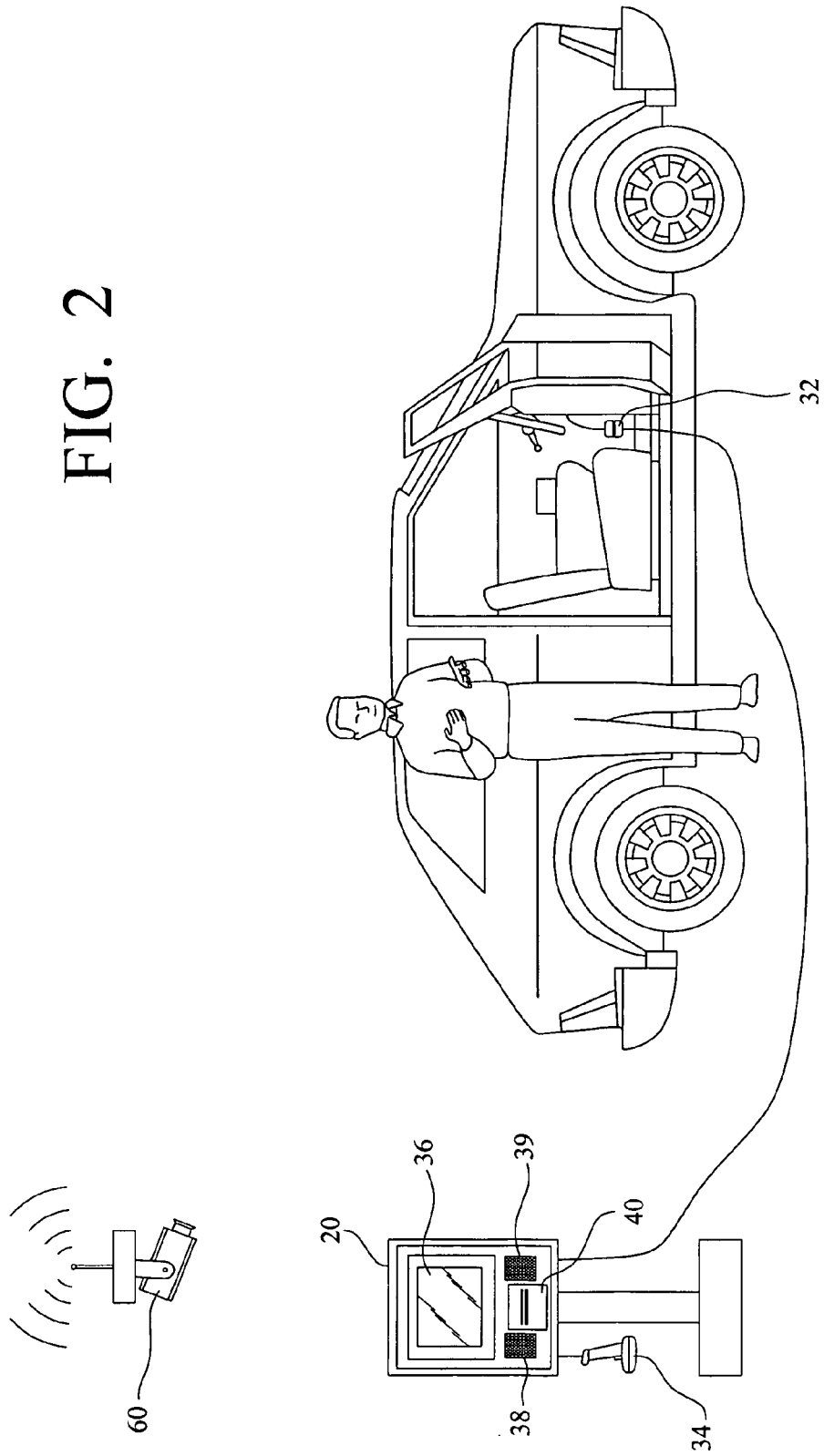
FIG. 2 is a view of an inspection station with an exemplary kiosk in accordance with the present invention.

Referring now to FIG. 2, an exemplary kiosk 20 in accordance with the present invention generally comprises a cabinet 30 that houses the necessary testing equipment, including (a) an OBD scanning device 32, which is operably linked to an internal computer housed within the cabinet 30; and (b) a bar code scanner 34, which is also operably linked to the internal computer and the function of which will be further described below. With respect to the OBD scanning device 32 and the bar code scanner 34, although not clearly illustrated in FIG. 2, it is contemplated that the cable associated with each device is retractable in that the cable is stored on a spool within the cabinet 30, but by manually pulling on the cable, the OBD scanning device 32 and/or the bar code scanner 34 can be extended away from the cabinet 30 for use of each device. Alternatively, the OBD scanning device 32 and/or the bar code scanner 34 could be operably linked to the internal computer through a wireless means, for example, using radio frequency transmissions or similar known wireless communication protocols. As such, each device could be readily manipulated into appropriate position without interference from or the nuisance of a cable.

Furthermore, in this exemplary embodiment, also housed within the cabinet 30 and viewable through an opening through the front portion of the cabinet 30 is a touch screen monitor 36 that serves as a display device and as an input device, as will be further described below. Finally, in this exemplary embodiment, the cabinet 30 houses speakers 38, 39, also connected to the internal computer to provide necessary audio instructions and information to the vehicle owner, along with a printer 40 connected to the internal computer for dispensing printed receipts or other documents.

With respect to the exemplary embodiment of FIG. 2, the illustrated kiosk 10 does not include a specific means for accepting a fee or payment associated with the testing. However, in most vehicle emissions testing programs, some form or fee or payment is required. Therefore, it is possible that an attendant could collect the fee before a vehicle can use the kiosk 10, or as described below with reference to FIG. 2A, the kiosk can be provided with the necessary equipment to accept payment.

In any event, and referring still to FIG. 2, each inspection location is designed such that the vehicle to be tested can be observed by an overview camera 60, which records images of the vehicle and the inspection location, as is further described below. This overview camera 60 is preferably positioned in such a manner that the make and model of the vehicle can be easily ascertained, and such that the vehicle can be seen by the camera 60 through the testing process. Images from the camera 60 are communicated to the kiosk 20 and the internal computer housed therein, preferably through wireless means, so that such images can be included in an electronic record of the testing of a vehicle.

Figure 2A:
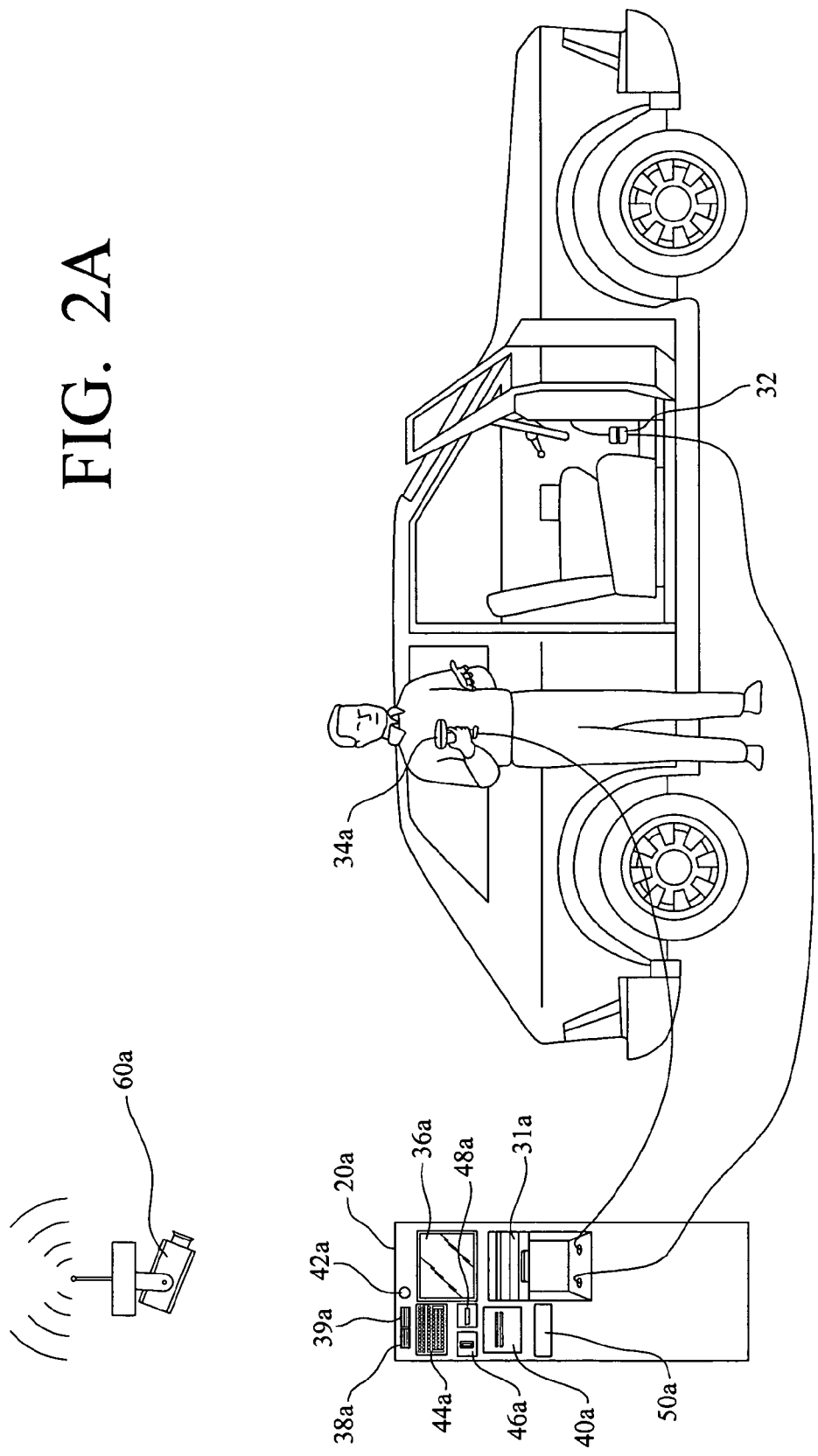
FIG. 2A is a view of an inspection station with another exemplary kiosk in accordance with the present invention.

FIG. 2A is a view of an inspection station with another exemplary kiosk 20a in accordance with the present invention. Similar to the embodiment described above with reference to FIG. 2, this exemplary kiosk 20a generally comprises a cabinet 30a that houses the necessary testing equipment, including (a) an OBD scanning device 32a, which is operably linked to an internal computer housed within the cabinet 30a;

and (b) a bar code scanner 34*a*, which is also operably linked to the internal computer. Again, it is contemplated that the cables associated with the OBD scanning device 32*a* and the bar code scanner 34*a* are retractable and can be extended away from the cabinet 30*a* for use of each device. Alternatively, the OBD scanning device 32*a* and/or the bar code scanner 34*a* could be operably linked to the internal computer through a wireless means. Furthermore, in this exemplary embodiment, rather than being readily accessible, it is contemplated that the OBD scanning device 32*a* and the bar code scanner 34*a* are stored in a cavity within the cabinet behind a secure door 31*a* that is only opened after a vehicle owner has verified his identity and/or rendered payment. This protects the OBD scanning device 32*a* and the bar code scanner 34*a* from environmental conditions (such as adverse weather) and from the possibility of vandalism. Similarly, although not illustrated in the Figures, the other input devices or components of the kiosk 20*a* (as described below) could also be placed behind some form of secure door.

A touch screen monitor 36*a* is housed within the cabinet 30*a* and viewable through an opening through the front portion of the cabinet 30*a*. Speakers 38*a*, 39*a*, also connected to the internal computer to provide necessary audio instructions and information to the vehicle owner, along with a printer 40*a* connected to the internal computer for dispensing printed receipts or other documents. Finally, in this exemplary embodiment, the cabinet 30*a* also houses a number of additional input devices, for example, a microphone 42*a* and a keyboard 44*a*. Also, and as mentioned above, to facilitate payment for the inspection services, in this exemplary embodiment, the cabinet 30*a* houses a magnetic card reader 46*a* (for credit or debit card payment), a paper currency/coupon acceptor 48*a* (such as that installed common vending machines), and a change/bill drawer 50*a* (such as that installed in an automated teller machine).

Referring still to FIG. 2A, and as with the embodiment described above with reference to FIG. 2, the inspection location is designed such that the vehicle to be tested can be observed by an overview camera 60*a*, with images from the camera 60*a* being communicated to the kiosk 20*a* and the internal computer housed therein.

Figures 1, 3:
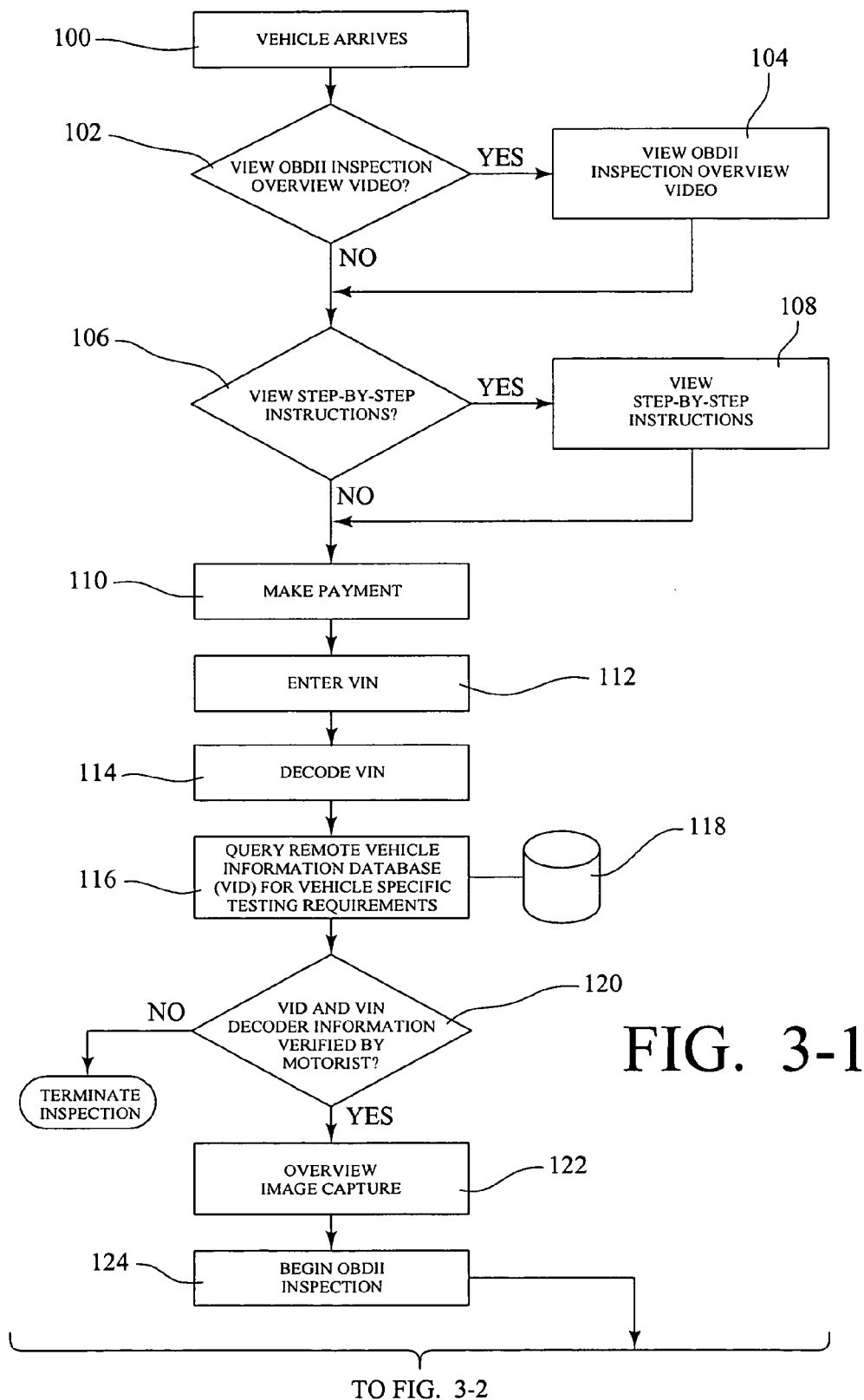
FIG. 3 is a flow chart depicting the general functionality of an exemplary implementation of the method and system of the present invention.

Referring now to the flow chart of FIG. 3, in this exemplary implementation of the method and system of the present invention, the OBD testing process commences when a vehicle arrives at a kiosk at an inspection location, as indicated by block 100. Through the touch screen 36, 36*a* (as illustrated in FIGS. 2 and 2A) or similar display device, the vehicle owner is asked whether he would like to view a video or similar multimedia presentation regarding the testing process, as indicated at decision 102. The vehicle owner chooses "yes" or "no" through selection of an appropriate button displayed on the touch screen 36, 36*a* or through another provided input device. If the selection is yes, the video is displayed, as indicated by block 104. In any event, the vehicle owner is then asked whether he would like to view step-by-step instructions on how to perform the testing, as indicated at decision 106. If the selection is yes, the instructions are displayed, as indicated by block 108.

After these initial steps have been completed, assuming payment is required and has not already been collected from an attendant or otherwise, payment is solicited from the vehicle owner, as indicated at block 110. In this regard, and as described above with reference to the exemplary embodiment of FIG. 2A, payment can be accepted through use of a credit or debit card that is preferably inserted into a magnetic card reader 46*a* for verification or through use of a paper currency/coupon acceptor 48*a*, with change being ejected through a secure change/bill drawer 50*a*.

Once payment has been made, data must be solicited to identify the vehicle, including input of the Vehicle Identification Number ("VIN") as indicated by block 112. This data entry is preferably accomplished using the bar code scanner 34, 34*a*, although it could be manually entered through a keyboard 44*a* (as illustrated in FIG. 2A) or another provided input device without departing from the spirit and scope of the present invention. Furthermore, it should be recognized that the bar code scanner 34, 34*a* could also be used to capture other data, for example, from a bar code on a license plate or vehicle registration documents, In any event, the VIN is then decoded by the internal computer housed within the cabinet, as indicated by block 114, with the resulting decoded information being compared to a vehicle information database 118 (as also illustrated in FIG. 1), as indicated at block 116. Through such comparison, certain vehicle attributes can be derived, and the specific testing requirements for the vehicle can be identified.

With respect to the various computational steps, including the decoding of the VIN and comparison of the resulting decoded information to the vehicle information database 118, such steps could be carried out by the local computer. However, in this exemplary implementation, data and information is input locally at the inspection location and then transmitted to a remote computer for analysis and storage, as illustrated in FIG. 1.

In any event, returning to the flow chart of FIG. 3, once the vehicle attributes and the specific testing requirements for the vehicle have been derived from the VIN, relevant information is displayed, such that the vehicle owner has the opportunity to verify the accuracy of the information, as indicated at decision 120. If the vehicle owner responds and indicates that the information is incorrect, the testing process is terminated; otherwise, testing continues.

At this point in the process, it is preferred that the overview camera 60, 60*a* be activated to capture an image of the inspection location and the vehicle, as indicated by block 122 of FIG. 3. In this regard, still images or video clips could be captured without departing from the spirit and scope of the present invention. These images and/or video clips are preferably stored in the internal computer as part of an electronic inspection record, as is further described below.

With these identification steps completed, the actual testing process commences, with the vehicle owner being prompted to complete certain tasks, as indicated by block 124 of FIG. 3. First, the vehicle owner may be prompted to conduct a "bulb check" to verify the operational status of the Malfunction Indicator Lamp ("MIL"), as indicated by block 126. In this regard, the MIL is checked with the key switch in the "on" position, but with the engine off. After such a "bulb check," the vehicle owner is prompted to turn the engine on, in an idling mode, as indicated by block 128 of FIG. 3. Then, the vehicle owner is prompted to connect the OBD scanning device 32, 32*a* (which is operably linked to the internal computer) to the OBD connector of the vehicle, as indicated by block 130. The OBD connector is usually located beneath the dashboard on the driver's side of the vehicle, or a similar, reasonably accessible location. To further assist the vehicle owner in locating the OBD connector, instructions or an illustration of the location may be displayed on the touch screen 36, 36*a* or other display device.

Once the OBD scanning device 32, 32*a* is connected, it interrogates the vehicle to solicit the necessary information and data from the vehicle's on-board computers, completing the requisite testing, as indicated by block 132 of FIG. 3.

During this interrogation process, it is preferred that the overview camera 60, 60a again be activated to capture an image of the inspection location and the vehicle, as indicated by block 134. Furthermore, although specific times for image capture are identified in this exemplary implementation of the method and system of the present invention, images could be captured at anytime during the testing process without departing from the spirit and scope of the present invention.

Once the information and data has been solicited and acquired from the on-board computers of the vehicle, it is promptly analyzed. Specifically, the information and data solicited and acquired through the interrogation of the vehicle is communicated to the internal computer of the kiosk 20 and then compared to a knowledge base 138 of known testing data. This knowledge base 138 may be resident on the local computer or at a remote location with the vehicle information database 118. In any event, the purpose of this analysis is to audit the information and data, i.e., to identify whether there are any irregularities in the acquired information and data that would indicate fraud or otherwise cast doubt on the validity of the testing. For example, it is contemplated that the number of parameter identification requests exchanged between the vehicle's on-board computers and the kiosk-based computer (commonly referred to as a "PID count") could be monitored in order to confirm that the PID Count is consistent with the year, make, and model of the vehicle. Of course, this is but one example of identifying testing irregularities, and various other acquired information and data could be similarly analyzed to identify irregularities without departing from the spirit and scope of the present invention. In any event, based on such a comparison of the information and data acquired through the interrogation of the vehicle to the information and data in the knowledge base 138, a determination is made if there are any such irregularities at decision 140, and if so, the testing process terminates. If not, the inspection is approved, as indicated by block 142. This is an important step in protecting against fraud.

Once the inspection has been completed and approved, a vehicle inspection report and receipt is preferably printed for the vehicle owner, as indicated by block 144, by the printer 40, 40a. Then, all acquired information and data, including the identification information and the captured images of the vehicle during the testing process, are collected in an electronic "inspection record" and transmitted to the vehicle information database 118 at the remote storage location 10 for storage and subsequent processing, as indicated by block 146. Again, this is preferably accomplished using data transfer equipment associated with the local computer, facilitating transmission of the information and data though an Internet connection, satellite communications, or similar means of data transport.

Finally, as a further, optional step, inspection records, individually or in batches, can be transmitted, as indicated by block 150, to the department of motor vehicles or similar governmental body (as indicated by reference numeral 11 in FIG. 1).

One of ordinary skill in the art will also recognize that additional embodiments are possible without departing from the teachings of the present invention or the scope of the claims which follow. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A system for vehicle emissions testing, comprising:
at least one remote data storage location; and
a plurality of inspection locations, each of said inspection locations having an overview camera for capturing images of the vehicle during testing and having at least one kiosk that includes
at least one input device for receiving identifying information associated with the vehicle,
an OBD scanning device for connecting to the OBD unit of the vehicle for emissions testing, and
data transfer equipment;
wherein information and data solicited by the OBD scanning device is compared to a knowledge base of known testing data to identify whether there are any irregularities in the solicited information and data, and if not, the identifying information is packaged with the solicited information and data, along with one or more images from the overview camera, into an inspection record for subsequent transmission to said remote data storage location using the data transfer equipment.

2. A system for vehicle emissions testing, comprising:
at least one remote data storage location; and
a plurality of inspection locations, each of said inspection locations having at least one kiosk that includes
at least one input device for receiving identifying associated with the vehicle,
an OBD scanning device for connecting to the OBD unit of the vehicle for emissions testing, and
data transfer equipment;
wherein information and data solicited by the OBD scanning device is compared to a knowledge base of known testing data to identify whether there are any irregularities in the solicited information and data, and if not, the identifying information is packaged with the solicited information and data into an inspection record for subsequent transmission to said remote data storage location using the data transfer equipment.

3. The system for vehicle emissions testing as recited in claim 2, in which said input device is a bar code scanner, said bar code scanner being used to scan and receive a vehicle identification number.

4. The system for vehicle emissions testing as recited in claim 2, said kiosk further including a display device for providing testing instructions to an individual.

5. The system for vehicle emissions testing as recited in claim 4, wherein said display device is a touch screen monitor that also serves as an input device.

6. The system for vehicle emissions testing as recited in claim 2, said kiosk further including one or more speakers for providing audio instructions to an individual.

7. The system for vehicle emissions testing as recited in claim 2, said kiosk further including a printer for dispensing printed receipts or other documents.

8. The system for vehicle emissions testing as recited in claim 2, said kiosk further including a means for accepting payment.

9. A kiosk for vehicle emissions testing, comprising:
a cabinet;
a computer housed within said cabinet;
a display device operably linked to the computer for providing testing instructions to an individual;
an input device for receiving identifying information associated with a vehicle, such identifying information being stored in an inspection record in the computer;
an OBD scanning device operably linked to the computer and adapted for connection to an OBD connector of a vehicle, upon such connection, said OBD scanning device interrogating and soliciting information and data from the vehicle and storing said information and data in the inspection record stored in the computer, wherein said computer compares the information and data stored in the inspection record to a knowledge base of known testing data to identify whether there are any irregularities in the information and data; and a means for communicating the inspection record to a remote storage location provided that no irregularities were identified in the information and data.

10. The kiosk for vehicle emissions testing as recited in claim 9, in which said input device is a bar code scanner, said bar code scanner being used to scan and receive a vehicle identification number.

11. The kiosk for vehicle emissions testing as recited in claim 9, wherein a touch screen monitor serves as the display device and the input device.

12. The kiosk for vehicle emissions testing as recited in claim 9, and further comprising a means for accepting payment.

13. The kiosk for vehicle emissions testing as recited in claim 12, wherein said means for accepting payment is a magnetic card reader.

14. The kiosk for vehicle emissions testing as recited in claim 12, wherein said means for accepting payment is a currency acceptor.

15. The kiosk for vehicle emissions testing as recited in claim 9, and further comprising one or more speakers for providing audio instructions to an individual.

16. The kiosk for vehicle emissions testing as recited in claim 9, and further comprising a printer for dispensing printed receipts or other documents.

17. A method for vehicle emissions testing, comprising the steps of:

providing at least one remote data storage location;

providing at least one testing kiosk, including a computer, an OBD scanning device, an input device, and a display device;

prompting an individual, through said display device, to input identifying information associated with a particular vehicle via said input device;

storing said identifying information in an inspection record in the computer;

prompting an individual, through said display device, to connect the OBD scanning device to an OBD connector of the particular vehicle, said OBD scanning device interrogating and soliciting information and data from the vehicle and storing said information and data in the inspection record stored in the computer;

comparing the solicited information and data to a knowledge base of known testing data to identify whether there are any irregularities in the solicited information and data that would indicate fraud; and if no irregularities are identified, completing the testing and communicating the inspection record to the remote data storage location.

18. The method for vehicle emissions testing as recited in claim 17, and further comprising the step of prompting an individual, through said display device, to tender payment through said testing kiosk.

19. The method for vehicle emissions testing as recited in claim 18, wherein said testing kiosk includes a magnetic card reader for accepting tendered payment.

20. The method for vehicle emissions testing as recited in claim 18, wherein said testing kiosk includes a currency acceptor for accepting tendered payment.

21. The method for vehicle emissions testing as recited in claim 17, wherein said input device is a bar code scanner, said bar code scanner being used to scan and receive a vehicle identification number.

22. The method for vehicle emissions testing as recited in claim 21, and farther comprising the step of decoding the vehicle identification number and comparing the resultant decoded information with a vehicle information database to identify specific testing requirements for the particular vehicle.

23. The method for vehicle emissions testing as recited in claim 17, and further comprising the step of printing an inspection report for the individual, which includes an indication of an outcome of the vehicle emissions testing.

24. A method for vehicle emissions testing, comprising the steps of:

providing at least one remote data storage location;

providing at least one testing kiosk, including a computer, an OBD scanning device, an input device, and a display device;

prompting an individual, through said display device, to input identifying information associated with a particular vehicle via said input device;

storing said identifying information in an inspection record in the computer;

prompting an individual, through said display device, to connect the OBD scanning device to an OBD connector of the particular vehicle, said OBD scanning device interrogating and soliciting information and data from the vehicle and storing said information and data in the inspection record stored in the computer;

capturing one or more images of the vehicle during testing and storing said images in the inspection record stored in the computer;

comparing the solicited information and data to a knowledge base of known testing data to identify whether there are any irregularities in the solicited information and data that would indicate fraud; and if no irregularities are identified, completing the testing and communicating the inspection record to the remote data storage location.

* * * * *